June 14, 1932.  C. A. PARSONS ET AL  1,862,827
STEAM TURBINE
Filed Nov 21, 1930   4 Sheets-Sheet 1
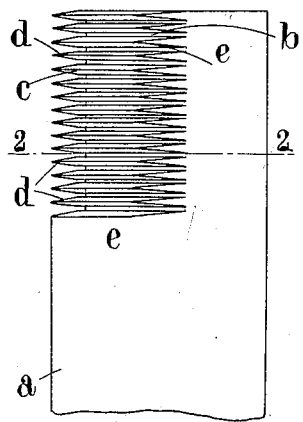
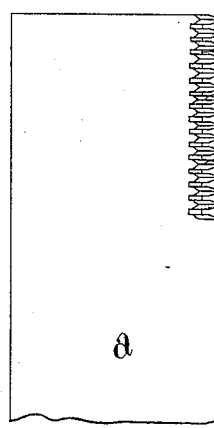
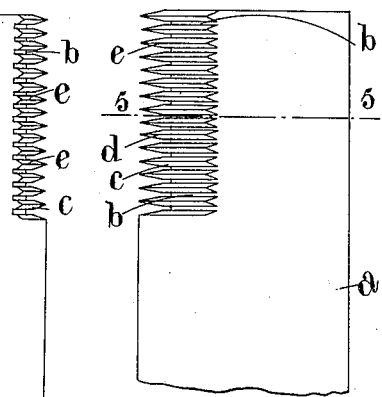
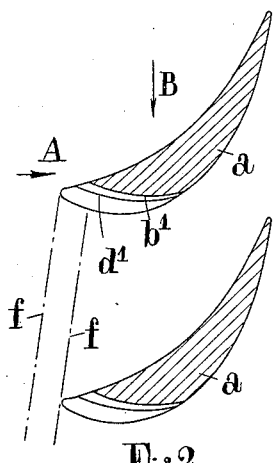
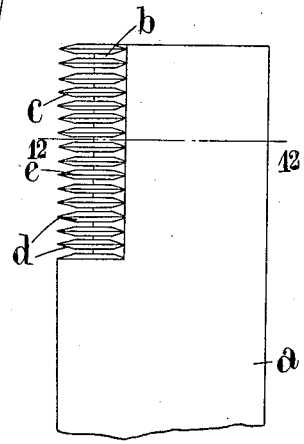
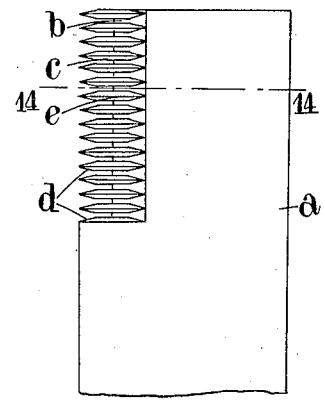
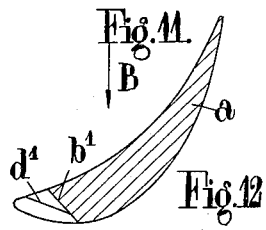
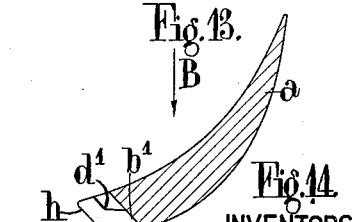

June 14, 1932.  C. A. PARSONS ET AL  1,862,827
STEAM TURBINE
Filed Nov 21, 1930     4 Sheets-Sheet 2
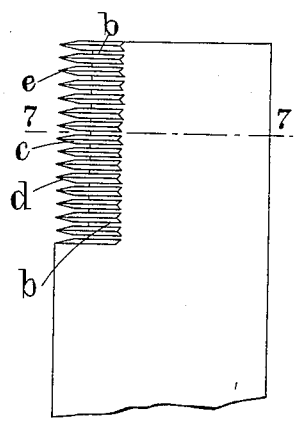
Fig.6.
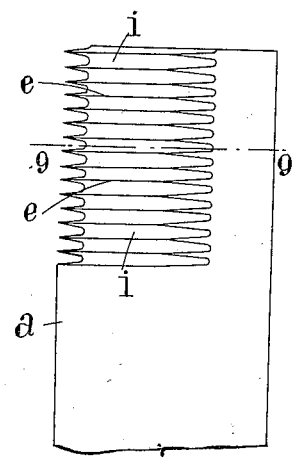
Fig.8.
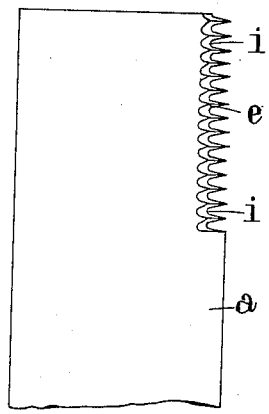
Fig.10.
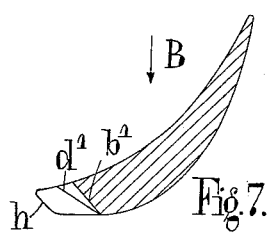
Fig.7.
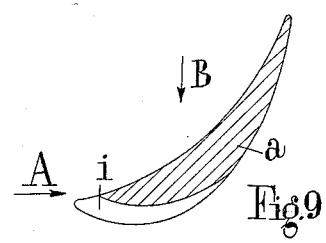
Fig.9.
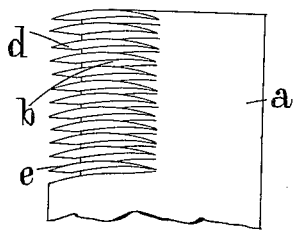
Fig.15.
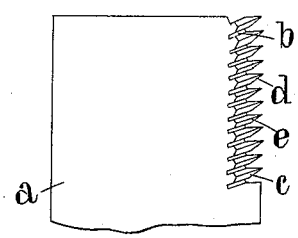
Fig.16.
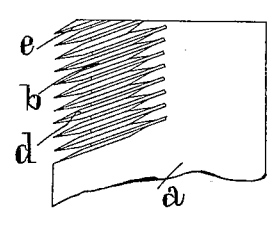
Fig.19.
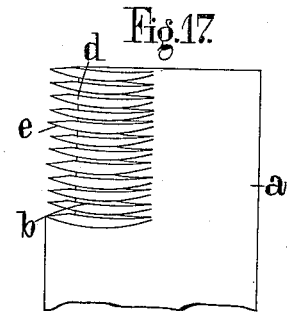
Fig.17.
Fig.18.
Fig.20.
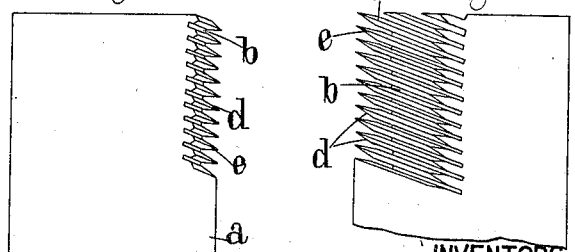
INVENTORS
Charles Algernon Parsons
Alfred Quintin Carnegie and
Francis William Gardner
BY THEIR ATTORNEYS June 14, 1932.  C. A. PARSONS ET AL  1,862,827
STEAM TURBINE
Filed Nov 21, 1930  4 Sheets-Sheet 3
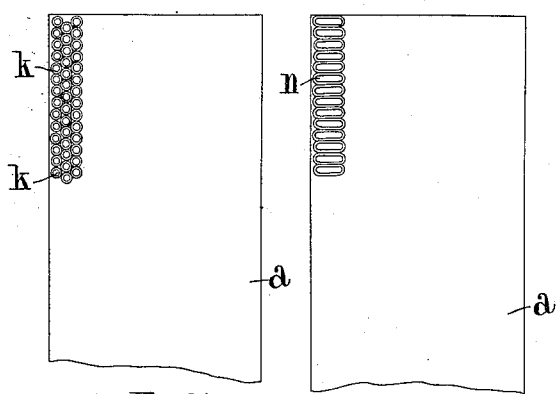
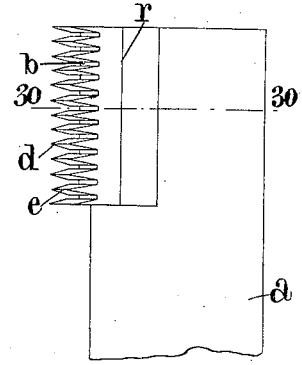
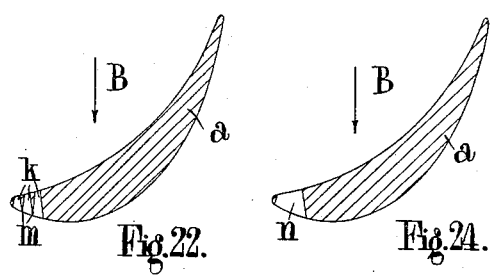
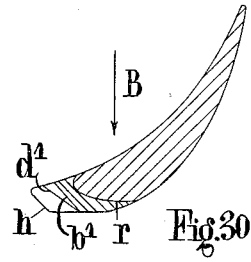
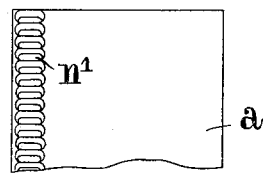
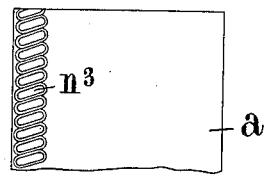
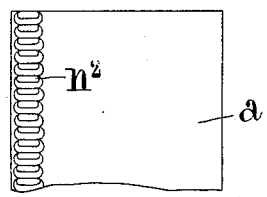
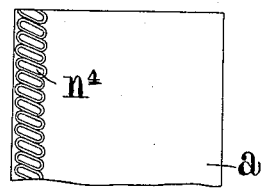
INVENTORS
Charles Algernon Parsons,
Alfred Quintin Parsons and
Francis William Gardner
BY THEIR ATTORNEYS
Philip Sawyer Rice Kennett June 14, 1932.  C. A. PARSONS ET AL  1,862,827

STEAM TURBINE

Filed Nov 21, 1930  4 Sheets-Sheet 4

INVENTORS
Charles Algernon Parsons
Alfred Quinton Carnegie and
Francis William Gardner
BY THEIR ATTORNEYS
Philip Sawyer Rice Kennedy Patented June 14, 1932

1,862,827

UNITED STATES PATENT OFFICE

CHARLES ALGERNON PARSONS, ALFRED QUINTIN CARNEGIE, AND FRANCIS WILLIAM GARDNER, OF NEWCASTLE-ON-TYNE, ENGLAND; SAID CARNEGIE AND SAID GARDNER ASSIGNORS TO SAID PARSONS; KATHARINE PARSONS, VINCENT THOMPSON, AND FREDERICK GORDON HAY BEDFORD LEGAL REPRESENTATIVES OF SAID CHARLES ALGERNON PARSONS, DECEASED

STEAM TURBINE

Application filed November 21, 1930, Serial No. 497,090, and in Great Britain January 22, 1930.

The invention relates to the blades of turbines or the like, and particularly to means for the prevention or reduction of the erosion of such blades.

In a steam turbine the blades most liable to erosion are the moving blades of the last or lowest pressure stage or stages.

Investigations have led us to the view that this erosion is due to the blades striking drops of water of condensation in suspension in the steam. At the low pressures ruling in the final stages of a turbine, the pressure drop giving velocity to the steam is very small and is capable of producing only an almost negligible velocity of the water particles, while in passing through the short distance from a row of stationary blades to the adjacent row of moving blades, the water particles, because of their relatively great inertia, acquire very little velocity from the steam. Consequently, these particles reach the moving blades with a comparatively low velocity and as a result they are struck by the moving blades with a relative velocity substantially equal to the circumferential velocity of the blades at the point of impact. Since the direction of the relative movement of the water particles and the blades is but slightly inclined to the plane of rotation of the blades only a small portion of the leading face near the inlet edge is liable to this impact, the remaining portion of that face being shielded by the preceding blade.

The relative direction at which such water particles strike a blade, is such that, particularly in the case of a reaction blade, there is a large component normal to the surface of the blade at the point of impact, and when the velocity of impact is sufficiently high, it is believed that the water-hammer pressure resulting from the impact makes a small indentation on the blade.

Moreover, it has been shown that when a space, even a very small space, containing water vapour at a very low pressure is enclosed by a liquid such as water, and the liquid is moving towards the cavity or space, even at a low velocity, the collapsing of the cavity can set up exceedingly high water-hammer pressures.

With turbine blades operating in a high vacuum, such as the last row of blades of a condensing steam turbine, such cavities can be enclosed by an irregularly-shaped drop of water impinging on the surface of a blade, or by a drop moving towards and closing the mouth of an indentation in the blade surface. When this occurs the material of the blade will be subjected to the very high water-hammer pressure resulting from the collapse of the cavity.

The object of the present invention is to reduce or prevent the observed erosive action.

The invention consists broadly in turbine blades, the leading surfaces of which, or of an attachment thereto, in the areas liable to attack are so shaped as to ensure break up of the water particles, thus avoiding blade damage.

The invention also consists in turbine blades, or attachments thereto, so constructed that the parts liable to strike the water particles have no element of surface area perpendicular or substantially perpendicular to the direction of movement of the blades or to the direction of impact with the water particles.

Referring to the accompanying diagrammatic drawings:—

Figure 1 shows a view of the end portion of a standard reaction blade provided with a combed edge, Figure 2 being a cross-section on the line 2—2 of Figure 1 showing two adjacent blades and Figure 3 a view of the blade as seen in the direction of the arrow A in Figure 2;

Figure 4 shows a view of a similar blade with the root of the comb inclined at a suitable angle, Figure 5 being a cross-section on the line 5—5 of Figure 4.

Figures 6 and 7 are views corresponding respectively to Figures 4 and 5 of a modified form in which both the root and the edge of the comb are inclined at a suitable angle;

Figures 8, 9 and 10 are views corresponding respectively to Figures 1, 2 and 3 of a modified form in which the combed edge is formed by a series of U-serrations;

Figures 11 and 12 are views corresponding respectively to Figures 4 and 5 of a modified form of blade having the root inclined and the sides of the comb knife-edged at right angles to the direction of motion;

Figures 13 and 14 are similar views of a modified form with the root and edge of the comb inclined and with the sides of the comb knife-edged at right angles to the direction of motion;

Figures 15 and 16 show views corresponding respectively to Figures 1 and 3 of a blade in which the comb is inclined upwards towards the circumference;

Figures 17 and 18 show similar views of a blade in which the comb is inclined downwards in relation to the circumference;

Figure 31:
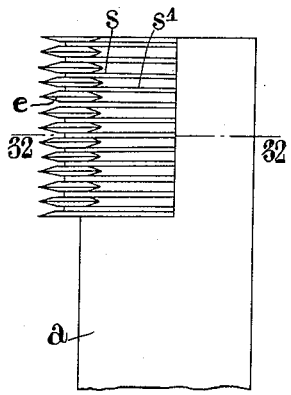
Figure 33:
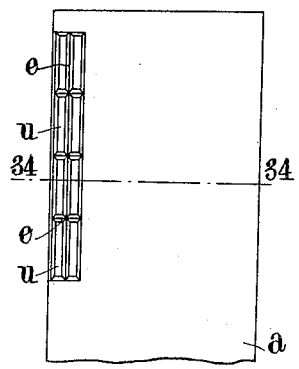
Figure 35:
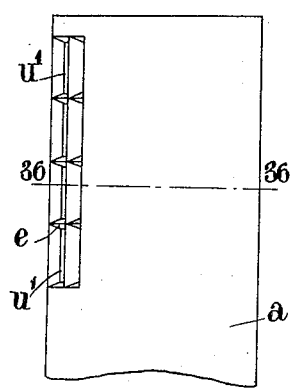
Figure 32:
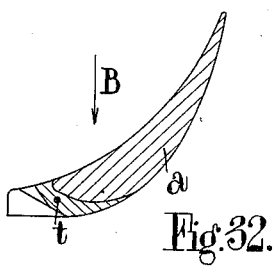
Figure 34:
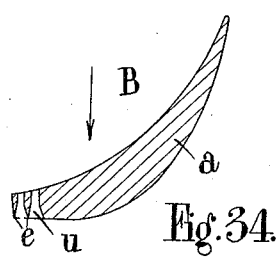
Figure 36:
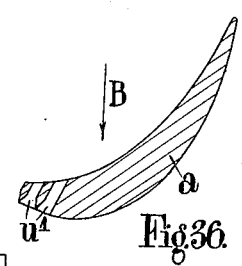
Figure 37:
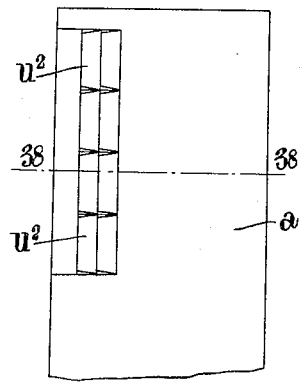
Figure 39:
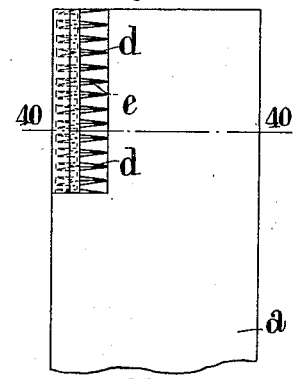
Figure 38:
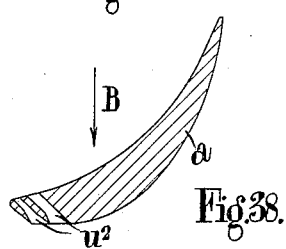
Figure 40:
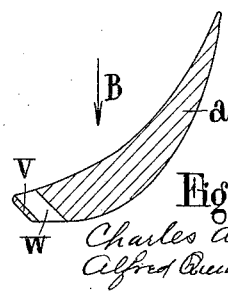

Figures 19 and 20 each show views of other modifications of inclined combs;

Figures 21 and 22 are views corresponding to Figures 4 and 5 of a form of blade having tapered holes;

Figures 23 and 24 are similar views of a blade having elongated holes;

Figures 25, 26, 27 and 28 show modifications of the blade shown in Figures 23 and 24, in which the elongated holes are inclined;

Figure 29 shows a view of a blade having a combed localized shield,

Figure 30 being a cross-section on the line 30—30 of Figure 29;

Figure 31 is a view of a blade in which the combed edge is built up from thin plates, Figure 32 being a cross-section on the line 32—32 of Figure 31;

Figure 33 is a view of a blade provided with a series of oblong holes,

Figure 34 being a cross-section on the line 34—34 of Figure 33;

Figures 35 and 36 are views corresponding to Figures 33 and 34 of a form of the invention in which the oblong holes are set at an angle to the plane of rotation;

Figures 37 and 38 show similar views of a modification of the form shown in Figures 35 and 36 in which the oblong holes are angled in a different direction; while finally Figure 39 shows a view of a blade having a combed edge and a shroud to form nozzles, Figure 40 being a corresponding cross-section on the line 40—40 of Figure 39.

The arrows, B, in the different figures show the direction of rotation of the relevant blades, while the numerals denoting a section line in any figure are the same as the number of the figure where the section on that line is shown.

Where desirable the same reference symbols are used in the different drawings to indicate corresponding parts.

In carrying the invention into effect according to one form, as shown in Figures 1, 2 and 3, applied to a turbine reaction blade, $a$, each rotor blade of the last ring or last few rings of blades is transversely slotted at the rear side of the inlet edge as by saw-cutting, the slots, $b$, being closely pitched and leaving a series of comb-like projections or teeth, $c$, forming sharp salients which are perpendicular to the axis of the blade. The depth of the slots from the inlet edge is preferably such that they extend through the portion of the leading face liable to erosion by striking water particles, so that the inlet edge has a comb-like structure.

The leading face of each projection is removed by bevelling the edges as shown at $d$, $d$, so as to leave a knife-edge, $e$, pointing in the direction of the movement of the blade.

In Figure 2 the root of a slot, $b$, is indicated at $b^1$, while the limit of the bevelling, $d$, is indicated at $d^1$.

The roots of the slots or saw-cuts, $b$, may by pointed or alternatively they may be rounded so as to reduce the likelihood of cracks.

In Figure 2, two adjacent blades, $a$, are shown with lines, $f$, $f$, the direction of which is found by compounding the circumferential velocity of the blade tips with the axial velocity of the water particles, these lines indicating in a general manner the direction of impingement between blade and water particle and the part of the blade liable to erosion.

In Figure 2, it will be seen that part of the root of the slots is substantially normal to the direction of impingement but according to the modification shown in Figures 4 and 5, the root, $b^1$, of the slot is inclined to the direction of impingement so that by no possibility can a particle of water strike a normal surface.

In the form of blade shown in Figures 6 and 7, before cutting the grooves, a flat, $h$, is formed, as shown in Figure 7, parallel to the axis of the blade, the plane of the flat lying at an angle to the direction of impingement, while the root of the groove, $b^1$, is inclined at about the same angle.

Alternatively, the teeth may be given the alignment, $h$, after the grooves have been cut.

In Figures 8, 9 and 10, the slots or grooves take the form of adjoining serrations, $i$, of a U cross-section, juxtaposed so as to leave salient knife edges, $e$, as before, the serrations following more or less the contour of the blade.

In the modification shown in Figures 11 and 12, the root, $b^1$, of the grooves is inclined to the direction of impingement, while the limit, $d^1$, of the bevelling lies nearly at right angles to the direction of motion.

In Figures 13 and 14, both the root of the grooves, $b^1$, and the flat, or alignment, $h$, are inclined as in Figure 7, while the limit, $d^1$, of the bevelling at first follows the inclination of the flat, $h$, and then runs substantially at right angles to the direction of rotation.

In Figures 15 and 16, the grooves, $b$, the planes of which are parallel to the axis of rotation of the blades, are tilted in relation to the length of the blade so that the knife-edges point towards the blade tips while similarly in Figures 17 and 18, the knife-edges point towards the blade roots.

In the form of the invention shown in Figure 15, in which the teeth of the comb are inclined with their tips pointing outwardly, the effect of centrifugal force is reduced.

In Figures 19 and 20, the grooves, $b$, the planes of which are parallel to the direction of motion of the blade tip, are inclined to the axis of rotation of the blades in one direction or the other as shown.

In some cases the grooves, $b$, may be inclined both to the axis of rotation and to the direction of motion of the blade tips.

Instead of the slots or grooves, $b$, a series of closely pitched holes, $k$, (see Figures 21 and 22) may be provided and the holes countersunk as shown on the leading face so as to leave a series of knife-edges or points, $m$.

As a modification of the last form of the invention described, instead of closely pitched holes of circular form, elongated holes, $n$, may be used as shown in Figures 23 and 24.

In Figure 25, similarly elongated holes, $n^1$, and in Figure 26, holes, $n^2$, run respectively upwards and downwards in a manner analogous to the slots in Figures 15 and 17, while the elongated holes, $n^3$, in Figure 27 and $n^4$ in Figure 28, run at angles corresponding to the grooves in Figures 19 and 20 respectively.

The holes, $k$, of Figures 21 and 22, may be similarly angled, if desired.

Instead of providing the slots or the like on the body of the blade itself, a member, $r$, is attached to the blade, $a$, as shown in Figures 29 and 30, this member being provided with any suitable grooves, holes or the like as described above.

In Figures 29 and 30, the detachable member, $r$, is slotted in general as in Figure 7, the roots, $b^1$, of the slots being parallel to the aligned tips, $h$, of the teeth.

The attached members may be made of material different from that of the blade and they are preferably so attached that they can be readily removed or replaced.

As an alternative to the immediately preceding construction, the member for attachment to the blades may be built up of a series of thin plates or laminæ of metal, $s$, $s^1$, (see Figures 31 and 32,) alternate plates, $s^1$, providing the required projections, for example the knife-edged teeth, $e$.

The plates may be held together by threading on a wire, such as $t$.

This structure is particularly convenient for use with tapered or twisted blades. If the laminæ are held together by a single wire or the like as described passing through all of them, the various plates can be readily adjusted on the wire to accommodate them to the contour of the blades.

In the form shown in Figures 33 and 34, a number of holes, $u$, of oblong form are arranged as shown in juxtaposed relation to form nozzles to direct water through the blade, these holes having inclined surfaces, $d$, so that knife-edges, $e, e$, are formed.

In Figure 34, the holes run in the same direction as that of rotation as shown by the arrow, B, but in Figures 35 and 36, the holes, $u^1$, while maintaining their longer axis parallel to that of the blade, are inclined in one direction and in Figures 37 and 38, the corresponding holes, $u^2$, are inclined in the other direction.

Any of the comb-like structures above described may be provided with a shroud, $v$, (see Figures 39 and 40) so that the combed edge and shroud together form nozzles, $w$, to direct water through the blades.

To obtain the best results, the knife-edges or equivalents referred to above should be of an almost razor-like fineness.

Preferably the comb-like projections are as closely pitched as practicable and may conveniently be spaced with a pitch of from one thirty-second to one eighth of an inch but we do not limit ourselves to this range of pitch.

Blades constructed in accordance with this invention cannot strike a water particle with a surface normal to the direction of the impact and it is practically impossible for an irregularly shaped drop of water to enclose a cavity on the surface of a blade. Further, if such a cavity were formed, the water would have substantially no velocity normal to the blade surface to cause the collapse of the cavity thereon.

If a water particle is struck by one of the sharp leading edges of the projections, it will be cut in two without harm to the projection, and the water will adhere to and acquire the velocity of the blade, or a considerable portion thereof, so that it is then incapable of doing damage by impinging on a succeeding blade with high relative velocity.

If the width of the space between adjacent projections is sufficiently small, it will be impossible for any but exceedingly small water particles to pass through without adhering to the surfaces, and these exceedingly small particles are least harmful because of their small mass and because they more readily acquire speed from the steam. For instance, a very small particle of water passing through one of the slots would immediately encounter the current of steam entering the next blade passage, and before it could pass across the next blade it would acquire so much velocity in the direction of the steam flow that it would meet the surface of the blade at a comparatively acute angle.

Moreover, when the slots are slightly inclined to the direction of movement of the blade, it will be practically impossible for any water particles to pass through without adhering to the surfaces of the projections.

We wish it to be understood that in claims appendant hereto, the term "depression" is used as including the case where the depression is so deep as actually to perforate the blade, while further, the word "blade" is used as including the case of a compound blade having a body and a protective sheath or like attachment thereto.

Having now described our invention, what we claim as new and desire to secure by Letters Patent is:—

1. An elastic-fluid turbine rotor blade of concavo-convex strip form, subject as regards a region adjacent the leading edge of the convex face to impact with liquid particles in said elastic fluid, in which said region subject to impact is provided with a multiplicity of sharp salients, elemental areas of the surfaces of which are disposed oblique to the direction of impact.

2. An elastic-fluid turbine rotor blade of concavo-convex strip form, subject as regards a region adjacent the leading edge of the convex face to impact with liquid particles in said elastic fluid, in which said region subject to impact is provided with a formation comprising a series of knife-edged salients.

3. An elastic-fluid turbine rotor blade of concavo-convex strip form, subject as regards a region adjacent the leading edge of the convex face to impact with liquid particles in said elastic fluid, in which said region subject to impact is provided with a multiplicity of elemental areas oblique to the direction of impact and intersecting in salient knife-edges.

4. An elastic-fluid turbine rotor blade of concavo-convex strip form, subject as regards a region adjacent the leading edge of the convex face to impact with liquid particles in said elastic fluid, in which said region subject to impact is provided with a series of depressions separated by salient knife-edges.

5. An elastic-fluid turbine rotor blade of concavo-convex strip form, subject as regards a region adjacent the leading edge of the convex face to impact with liquid particles in said elastic fluid, in which said region subject to impact is patterned with depressions separated by salient knife-edges.

6. An elastic-fluid turbine rotor blade of concavo-convex strip form, subject as regards a region adjacent the leading edge of the convex face to impact with liquid particles in said elastic fluid, in which said region subject to impact is covered with juxtaposed depressions, the sides of which are bevelled to form salient knife-edges.

7. An elastic-fluid turbine rotor blade of concavo-convex strip form, subject as regards a region adjacent the leading edge of the convex face to impact with liquid particles in said elastic fluid, in which said region subject to impact is provided with a series of juxtaposed depressions taking the form of perforations passing through the blade from the convex face to the concave face thereof, said juxtaposed perforations being separated by knife-edges at the end corresponding to said convex face.

8. An elastic-fluid turbine rotor blade of concavo-convex strip form, in which the inlet edge near the tip is of comb-like form.

9. An elastic-fluid turbine rotor blade of concavo-convex strip form, subject as regards a region adjacent the leading edge of the convex face to impact with liquid particles in said elastic fluid, in which said region subject to impact is provided with juxtaposed grooves intersecting in knife-edges.

10. An elastic-fluid turbine rotor blade as claimed in claim 9, in which said juxtaposed grooves are disposed transverse to the length of said blade.

11. An elastic-fluid turbine rotor blade as claimed in claim 9, in which said juxtaposed grooves are tilted in relation to the length of said blade.

12. An elastic-fluid turbine rotor blade as claimed in claim 9, in which the aggregate of said grooves and knife-edges is composed of juxtaposed laminæ.

In testimony whereof we have signed our names to this specification.

CHARLES ALGERNON PARSONS.
ALFRED QUINTIN CARNEGIE.
FRANCIS WILLIAM GARDNER.